(12) United States Patent
Haller (10) Patent No.: US 11,420,539 B2
(45) Date of Patent: Aug. 23, 2022

(54) VEHICLE SEAT WITH INCLINING BACKREST FEATURE

(71) Applicant: GRAMMER AG, Ursensollen (DE)

(72) Inventor: Erwin Haller, Birgland (DE)

(73) Assignee: GRAMMER AG, Ursensollen (DE)

( * ) Notice: Subject to any disclaimer, the term of this patent is extended or adjusted under 35 U.S.C. 154(b) by 22 days.

(21) Appl. No.: 17/124,700

(22) Filed: Dec. 17, 2020

(65) Prior Publication Data
US 2021/0178937 A1 Jun. 17, 2021

(30) Foreign Application Priority Data

Dec. 17, 2019 (DE) .......................... 102019134704.1

(51) Int. Cl.
*B60N 2/22* (2006.01)
*B60N 2/50* (2006.01)

(52) U.S. Cl.
CPC .......... *B60N 2/2209* (2013.01); *B60N 2/504* (2013.01); *B60N 2002/2204* (2013.01)

(58) Field of Classification Search
CPC .................. B60N 2/2209; B60N 2/504; B60N 2002/2204; B60N 2/22
USPC ................................................ 297/343, 342
See application file for complete search history.

(56) References Cited

U.S. PATENT DOCUMENTS

| 1,984,281 | A |   | 11/1932 | Poggendorf |                       |
|-----------|---|---|---------|------------|-----------------------|
| 2,374,848 | A | * | 5/1945  | Wohlk      | A47C 1/03294          |
|           |   |   |         |            | 297/343               |
| 2,860,691 | A |   | 11/1958 | Caesar     |                       |
| 3,224,808 | A | * | 12/1965 | Spielman   | A47C 1/03294          |
|           |   |   |         |            | 297/452.17            |

(Continued)

FOREIGN PATENT DOCUMENTS

| AU | 598737 | 7/1990 |
| BE | 781040 | 7/1972 |

(Continued)

OTHER PUBLICATIONS

Extended Search Report with machine translation for European Patent Application No. 20000447.1, dated Apr. 30, 2021, 9 pages.

(Continued)

*Primary Examiner* — Milton Nelson, Jr.
(74) *Attorney, Agent, or Firm* — Sheridan Ross P.C.

(57) ABSTRACT

The invention relates to a vehicle seat comprising a backrest element having a first contact surface which is arranged within a first imaginary plane, and a seat element having a second contact surface which is arranged within a second imaginary plane which is defined by a longitudinal axis and a width axis of the vehicle seat, wherein the first imaginary plane and the second imaginary plane intersect in an intersecting axis, wherein the backrest element is pivotable relative to the seat element about a rotational axis, wherein an inclination angle of the backrest element extends between the first imaginary plane and a central axis which runs (Continued)

perpendicularly to the second imaginary plane, wherein, in a first position of the backrest element, a distance along the longitudinal axis between the rotational axis and the intersecting axis is at least 60 mm, wherein, in the first position of the backrest element, the inclination angle is substantially 10°.

20 Claims, 4 Drawing Sheets

(56) References Cited

U.S. PATENT DOCUMENTS

| | | | | |
|---|---|---|---|---|
| 4,018,166 | A | * | 4/1977 | Gutridge ............... B61D 33/00 297/343 |
| 6,767,055 | B1 | | 7/2004 | Sparks |
| 7,874,618 | B2 | | 1/2011 | Kohl et al. |
| 2008/0252128 | A1 | * | 10/2008 | Nishikawa ............ B60N 2/233 297/354.11 |
| 2014/0159436 | A1 | | 6/2014 | Iacobucci | |

FOREIGN PATENT DOCUMENTS

| | | | |
|---|---|---|---|
| DE | 1256076 | | 12/1967 |
| DE | 1264703 | | 3/1968 |
| DE | 69219029 | | 7/1997 |
| DE | 19649587 | | 6/1998 |
| DE | 10109233 | | 8/2002 |
| DE | 60117923 | | 9/2006 |
| DE | 102007042489 | | 3/2009 |
| DE | 102008005829 | | 7/2009 |
| DE | 112014000389 | | 9/2015 |
| DE | 102015110807 | | 1/2016 |
| DE | 102017130953 A1 * | 6/2019 | ............... B60N 2/06 |
| EP | 0970637 | | 1/2000 |
| EP | 2039265 | | 3/2009 |
| EP | 3428005 | | 1/2019 |
| FR | 2067806 | | 8/1971 |
| FR | 2946577 | | 12/2010 |
| JP | S49-54605 | | 5/1974 |
| JP | S56-30130 | | 11/1977 |
| JP | S56-70715 | | 6/1981 |
| JP | S61-135835 | | 6/1986 |
| JP | S63-98836 | | 6/1988 |
| JP | H01-177946 | | 12/1989 |
| JP | H06-72450 | | 10/1994 |
| JP | H07-257242 | | 10/1995 |
| JP | 2001095638 A * | 4/2001 | ........... B60N 2/2209 |
| JP | 2006-198306 | | 8/2006 |
| JP | 2014-108638 | | 6/2014 |
| WO | WO 2013/068674 | | 5/2013 |

OTHER PUBLICATIONS

Official Action for German Patent Application No. 102019134704.1, dated Oct. 23, 2020, 9 pages.
Machine Translation of Official Action for German Patent Application No. 102019134704.1, dated Oct. 23, 2020, 11 pages.

* cited by examiner

VEHICLE SEAT WITH INCLINING BACKREST FEATURE

CROSS-REFERENCE TO RELATED APPLICATION

This application claims the benefit of German Patent Application No. 10 2019 134 704.1, filed Dec. 17, 2019, the entire contents of which are incorporated herein by reference.

FIELD

The invention relates to a vehicle seat comprising a backrest element having a first contact surface which is arranged within a first imaginary plane, and a seat element having a second contact surface which is arranged within a second imaginary plane which is defined by a longitudinal axis (X) and a width axis (Y) of the vehicle seat, wherein the first imaginary plane and the second imaginary plane intersect in an intersecting axis (SR), wherein the backrest element is pivotable relative to the seat element about a rotational axis (RD), wherein an inclination angle $\alpha$ of the backrest element extends between the first imaginary plane and a central axis which runs perpendicularly to the second imaginary plane.

BACKGROUND

Vehicle seats of this type are provided particularly in commercial vehicles, such as tractors, construction vehicles, forklifts, lorries, etc. In the case of tractors or forklifts, it is often preferred that the backrest does not extend to the shoulder region when in an upright position. This allows the driver greater freedom of movement with regard to a rotation of the upper body, which is advantageous, for example, when driving in reverse.

It is often desirable that the backrest element can be inclined or pivoted towards the rear relative to the seat element. Such an inclination towards the rear can be advantageous for a driver in order to move to a rest position. In the case of reach trucks or telescopic loaders, it may also be necessary for the driver to assume a working position with an upward viewing direction and thus to incline the backrest element towards the rear. However, if the backrest is inclined towards the rear, a short backrest can be perceived as disadvantageous because the shoulder joint point of the driver is not adequately supported by the backrest element.

SUMMARY

The problem addressed by the present invention is that of providing a vehicle seat that overcomes the disadvantages mentioned above.

This problem is solved by a vehicle seat comprising a backrest element having a first contact surface which is arranged within a first imaginary plane, and a seat element having a second contact surface which is arranged within a second imaginary plane which is defined by a longitudinal axis X and a width axis Y of the vehicle seat, wherein the first imaginary plane and the second imaginary plane intersect in an intersecting axis SR, wherein the backrest element is pivotable relative to the seat element about a rotational axis RD, wherein an inclination angle $\alpha$ of the backrest element extends between the first imaginary plane and a central axis which runs perpendicularly to the second imaginary plane, wherein, in a first position of the backrest element, a distance A along the longitudinal axis X between the rotational axis RD and the intersecting axis SR is at least 60 mm, wherein, in the first position of the backrest element, the inclination angle $\alpha$ is substantially 10°.

The first and the second contact surface are suitable and provided for coming into contact with an occupant. When compared to standard vehicle seats, the rotational axis RD is displaced towards the rear along the longitudinal axis X. For this purpose, the intersecting axis SR serves as a reference point, which is defined such that the first and second imaginary planes intersect in said axis. The first and second contact surfaces are regarded as being largely flat.

It would naturally be conceivable that the backrest element has a curvature and/or is designed to be shell-shaped. In such a configuration, a lateral region of the backrest element is designed such that it protrudes towards the front along the longitudinal direction (X). As a result, the backrest element bears ergonomically against the occupant. In such a configuration, a rear central region of the backrest element, which extends substantially in a planar manner or parallel to the width axis Y, can be assumed to be the first contact surface.

The displacement of the rotational axis RD along the longitudinal axis (X) towards the rear results in an upper edge of the backrest element having a large upward displacement in relation to the intersecting axis SR when the backrest element is pivoted towards the rear. Accordingly, the first contact surface is also displaced upwards. In this case, the term "displaced upwards" means that the first contact surface is displaced upwards along the back of the occupant. A distance between the upper edge of the backrest element and the shoulder joint point of the occupant is thus reduced. From the prior art, seats are known which have a distance A of approximately 20 mm. With the vehicle seat according to the invention having a distance A of at least 60 mm, a displacement of the first contact surface upwards is achieved, which is sufficient to ensure corresponding support of the upper back.

In this case, what is known as a "50 perc person" is preferably assumed. This statistical value of the 50th percentile represents the body measurements "medium." Statistically, 50% of all values are thus above and below this value. A male "50 perc driver" therefore has a body height of 175.0 cm and a shoulder height of 145.0 cm (see W. Lange, "Kleine Ergonomische Datensammlung" (Small Ergonomic Data Collection)).

The distance A is determined in a first position, in which the inclination angle $\alpha$ is substantially 10°. The term "substantially" means that the value can deviate by the usual tolerances. The inclination angle can advantageously deviate by a value of ±2°, more preferably by a value of ±1°. An inclination angle $\alpha$ of substantially 10° is an inclination angle which allows for a comfortable upright sitting position.

The distance A is preferably at least 65 mm. Further preferably, the distance A is at least 70 mm. Further preferably, the distance A is at least 80 mm; further preferably, the distance A is at least 90 mm; further preferably, the distance A is at least 120 mm. Further preferably, the distance A is at least 150 mm. Further preferably, the distance A is at least 180 mm. The maximum distance A is preferably approximately 200 mm.

According to a further preferred embodiment, the vehicle seat comprises a seat substructure. The seat substructure can comprise, for example, a scissor frame arrangement which is arranged on a vehicle body floor. It would also be conceivable that the seat substructure is a frame arrangement that can be arranged on the vehicle bodies. The seat substructure advantageously comprises a suspension and/or damping device for vertical and/or horizontal vibrations. In this case, a suspension system refers to a device which effects a reset after a deflection by vertical or horizontal vibrations. Damping effects a dissipation of the kinetic energy introduced by the vertical and/or horizontal vibrations, wherein the seat element is displaceably arranged on a seat substructure. It is also conceivable that the seat substructure is displaceably arranged on the vehicle body floor by means of a rail system.

According to a further preferred embodiment, the seat element is displaceably arranged on the seat substructure. The seat element is preferably displaceable along the longitudinal axis X. Advantageously, the seat element is displaced along the longitudinal direction X when the backrest element is pivoted by the inclination angle $\alpha$. If the backrest element is inclined towards the rear, the seat element is preferably displaced towards the front along the longitudinal axis X. The seat element preferably comprises a plate-like element which is displaceably arranged on the seat substructure. A cushion element is preferably arranged on the plate-like element. The cushion element is advantageously arranged on the upper side of the plate-like element. A cover can advantageously also be arranged over the cushion element or the plate-like element. The cushion element can preferably be designed to be shell-like in order to provide an ergonomically comfortable seat surface.

According to a further preferred embodiment, the rotational axis (RD) is spaced apart from the intersecting axis SR along a height axis Z. Preferably, the backrest element comprises a lower portion which extends below the rotational axis (RD). When the upper portion of the backrest element is inclined towards the rear, said lower portion pivots correspondingly towards the front along the longitudinal direction. As a result, lumbar support can be achieved in the simplest possible manner, which provides additional comfort.

According to a further preferred embodiment, the vehicle seat has a retaining device, on which the backrest element is pivotably arranged. The retaining device is advantageously connected to the seat substructure. In this case, the retaining device can comprise two legs which extend upwards along the height axis Z. A bearing, on which the backrest is pivotably mounted, is provided on each of said legs. Preferably, a physical rotational axis running continuously along the width of the backrest element can be provided. Alternatively, two rotational axes can be provided on the side of the backrest element, which are mounted in the bearings of the legs. The rotational axis RD would therefore be an imaginary rotational axis. The retaining device can preferably further comprise a connecting element which extends along the width axis Y and connects the two legs. This connecting element can be integral with the seat substructure or can be firmly arranged on the seat substructure.

According to a further preferred embodiment, the retaining device comprises a locking device which locks an inclination of the backrest element. Accordingly, the backrest element can be immobilised such that it has a specific inclination angle $\alpha$ to the central axis. Preferably, an operating device is provided, by means of which the locking device can be operated and by means of which an inclination of the backrest element can be adjusted. A locking device can comprise various types of mechanisms. For example, the locking device can comprise a releasable toothing of a catch element in a tooth element. Advantageously, the tooth element has a circular segment-shaped portion, and a spring force is applied to the catch element. The toothing can advantageously be released via the operating element. Such an operating element could be a lever element, an actuator, or a Bowden cable. Advantageously, the locking device could be provided on or integrated in at least one bearing of a rotational axis.

According to a further preferred embodiment, the vehicle seat comprises a reset mechanism, by means of which a pivoting of the backrest element about the rotational axis (RD) can be reset to the starting position. This starting position could preferably be the first position or a position, in which the backrest element is aligned substantially perpendicularly to the seat element. The reset mechanism can comprise, for example, an elastic element or a torsion spring. Advantageously, the reset mechanism could be provided on or integrated in the pivot bearing of the bearing shaft element.

According to a further preferred embodiment, the backrest element has a frame or a shell element. The rotational axis (RD) preferably extends along the longitudinal direction (X) behind the frame or the shell element. Accordingly, the rotational axis extends on the side of the backrest element facing away from the occupant. The backrest element preferably comprises a cushion element which is arranged on the frame or the shell element.

According to a further preferred embodiment, the backrest element and the seat element are mechanically coupled. This mechanical coupling is preferably suitable and provided for causing a translational movement of the seat element along the longitudinal axis (X) when the backrest element swivels about the rotational axis (RD) or the inclination angle $\alpha$. When the backrest element is pivoted towards the rear, the seat element would thus advantageously be displaced towards the front along the longitudinal axis or away from the backrest element along the longitudinal axis (X). When the backrest element is pivoted towards the front, the seat element would preferably be displaced towards the rear along the longitudinal axis or towards the backrest element along the longitudinal axis (X). An elastic bridge portion is advantageously provided at least in sections between the backrest element and the seat element. This bridge portion preferably connects the cushion element of the backrest element to the cushion element of the seat element.

According to a further preferred embodiment, the backrest element comprises a length modification device which is suitable and provided for effecting an expansion of a length of the backrest element when the backrest element is pivoted about the rotational axis (RD). Advantageously, an upper edge of the backrest element is in this case displaced upwards. The cushion element can preferably be designed to be elastic in the upper region. The length modification device can comprise an actuator which can displace the upper edge of the backrest element. This actuator can be operated electrically, hydraulically, or pneumatically. Preferably, the upper edge of the backrest element is displaceably coupled to a main region of the backrest element. This can be achieved, for example, by a telescope arrangement or the like.

BRIEF DESCRIPTION OF THE DRAWINGS

Further advantages, objectives and characteristics of the present invention shall be explained using the following description of the attached drawings. In the different embodiments, similar components can have the same reference signs.

In the drawings.

DETAILED DESCRIPTION

Figure 1:
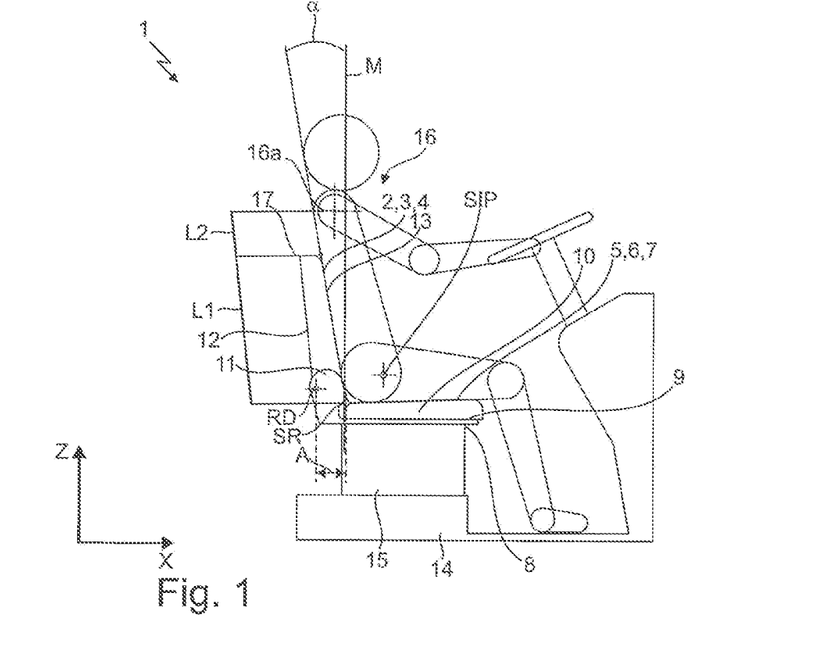
FIG. 1 shows a vehicle seat with a first inclination angle.
Figure 6A:
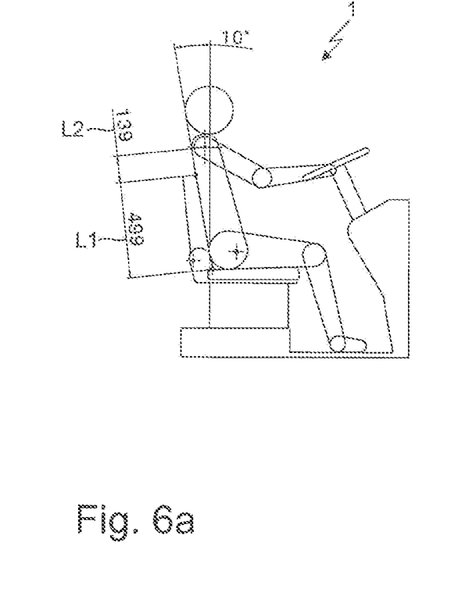
FIGS. 6a-6h show a vehicle seat with different inclination angles.
Figure 6B:
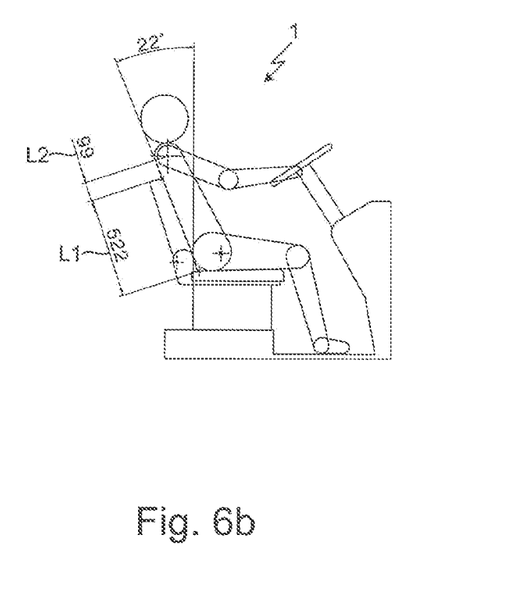
Figure 6C:
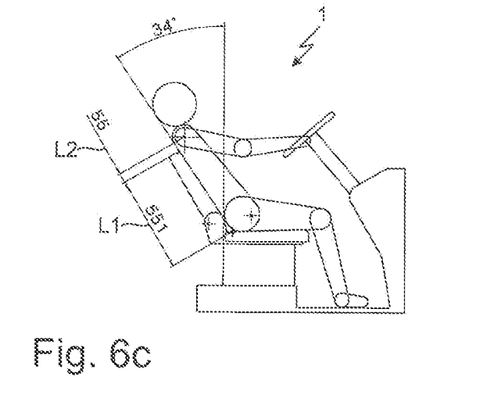
Figure 6D:
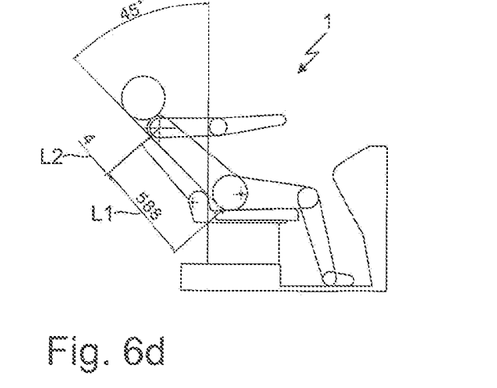
Figure 6E:
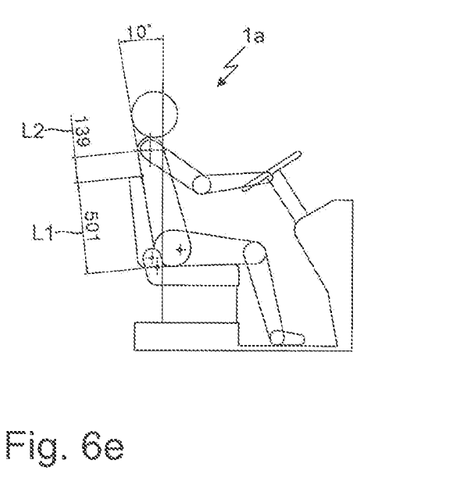
Figure 6F:
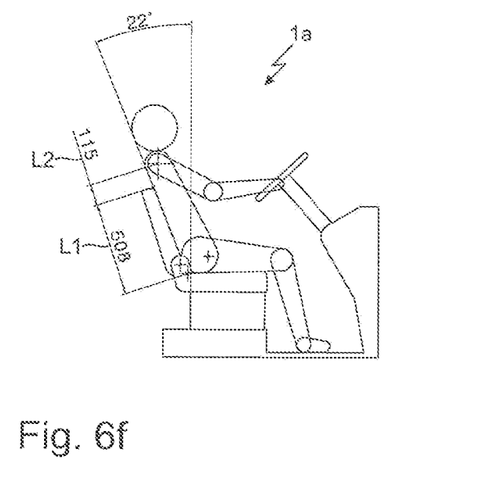
Figure 6G:
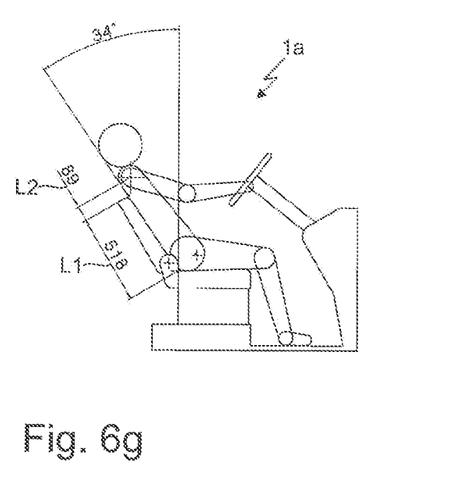
Figure 6H:
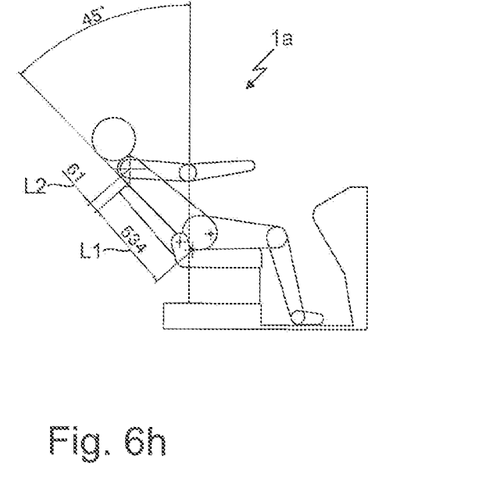

FIGS. 1 and 6a show a vehicle seat 1, comprising a backrest element 2 having a first contact surface 3 which is arranged within a first imaginary plane 4, and a seat element 5 having a second contact surface 6 which is arranged within a second imaginary plane 7 which is defined by a longitudinal axis X and a width axis Y of the vehicle seat 1, wherein the first imaginary plane 4 and the second imaginary plane 7 intersect in an intersecting axis SR, wherein the backrest element 2 is pivotable relative to the seat element 5 about a rotational axis RD, wherein an inclination angle α of the backrest element 2 extends between the first imaginary plane 4 and a central axis M which runs perpendicularly to the second imaginary plane 4, wherein, in a first position of the backrest element, a distance A along the longitudinal axis X between the rotational axis RD and the intersecting axis SR is at least 60 mm, wherein, in the first position of the backrest element, the inclination angle α is substantially 10°.

The distance A is preferably at least 65 mm; further preferably, the distance A is at least 70 mm; further preferably, the distance A is at least 80 mm; further preferably, the distance A is at least 90 mm. The maximum distance A is preferably 200 mm.

The vehicle seat 1 comprises a seat substructure 8 which is arranged on a vehicle body 14. This can be achieved, for example, by means of a rail system which allows for the vehicle seat to be displaced along the longitudinal axis X. The occupant can therefore change the distance to the dashboard or the pedals. The seat substructure 8 can be, for example, a scissor frame arrangement and/or a frame arrangement which can be arranged on the vehicle bodies. The seat substructure 8 can furthermore comprise a suspension and/or damping device 15 for vertical and/or horizontal vibrations.

The vehicle seat 1 extends along a height axis Z, a width axis Y, and a longitudinal axis. Two directions are each to be assigned to the respective axes. For example, the height axis Z thus comprises the upward and downward directions, wherein the downward direction leads to the vehicle body. The width axis Y comprises the directions towards the right and towards the left. The longitudinal axis X includes the directions towards the front, i.e., the direction towards the dashboard and the pedals, and towards the rear.

The seat element 5 is displaceably arranged on a seat substructure 8. This can be achieved, for example, by a rail system. For this purpose, the seat element comprises, for example, a plate-like element 9, on which the rail system is arranged. The rail system can also be fastened to a frame of the seat substructure 8, so that the plate-like element 9 can be displaced along the longitudinal axis X. Alternatively, it would naturally also be conceivable that a frame or a seat shell is used instead of the plate-like element. When the backrest element 2 is pivoted by the inclination angle α, the seat element 5 is displaced along the longitudinal direction X.

The seat element 5 further comprises a cushion element 10, which is arranged on the plate-like element 9, the frame, the seat shell, etc.

The backrest element 2 has a frame, a shell element 12, or the like. Furthermore, the backrest element 2 comprises a cushion element 13 which is arranged on the frame, the shell element 12, or the like. Furthermore, a cover can be arranged on the cushion elements 10, 13 of the backrest element 2 and the seat element 5.

At least in sections, an elastic bridge portion can be provided between the seat element 5 and the backrest element 2, or between the cushion element 10 and the cushion element 13, which bridge portion connects said elements.

Figure 3:
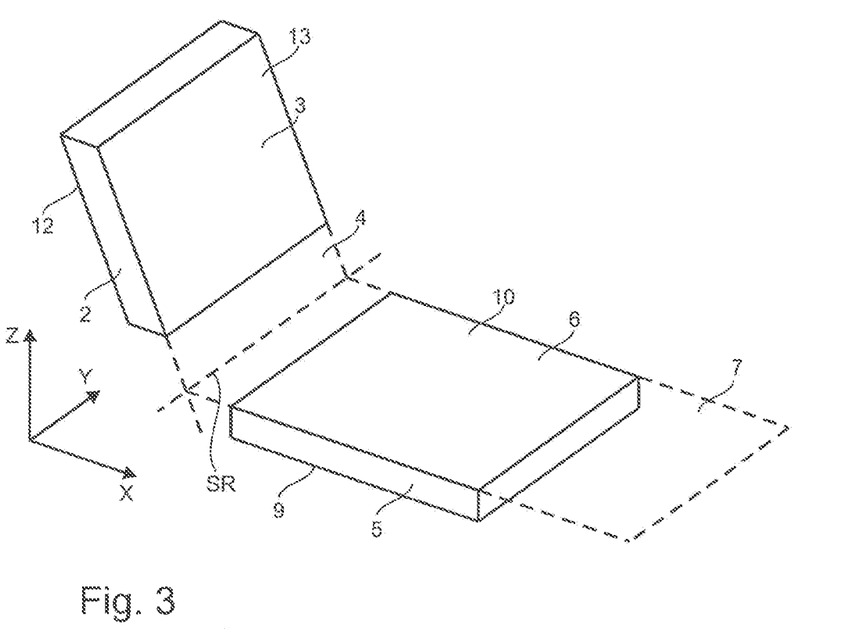
FIG. 3 is a schematic diagram of the arrangement of the backrest element and the seat element.
Figure 4:
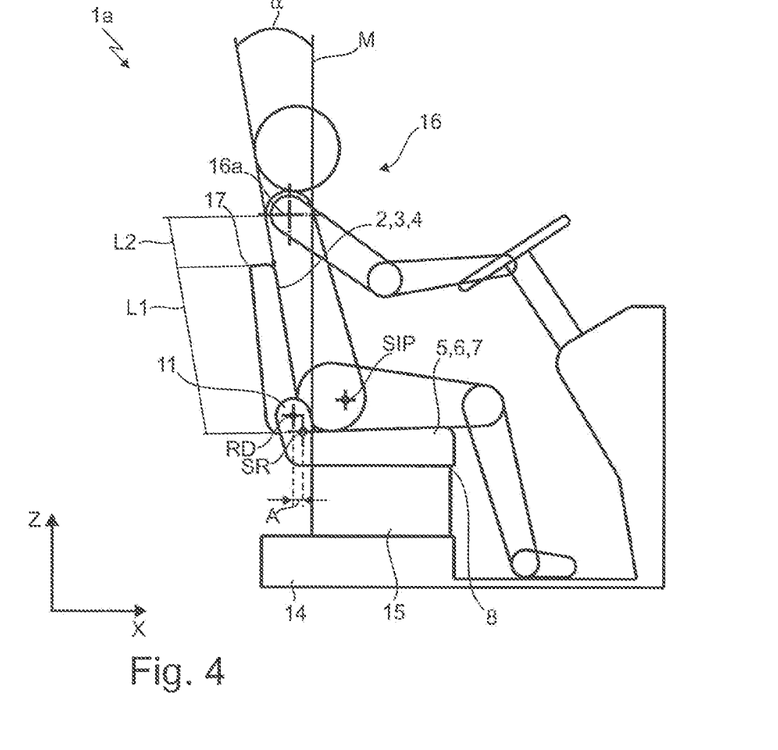
FIG. 4 shows a further vehicle seat with a first inclination angle.
Figure 5:
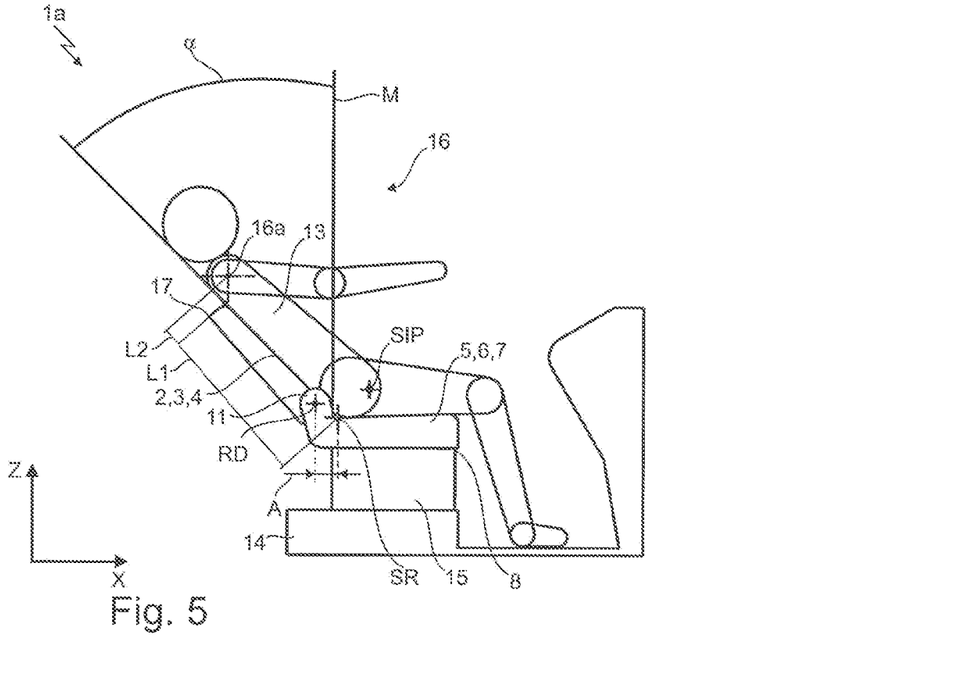
FIG. 5 shows a further vehicle seat with a second inclination angle.

FIG. 3 shows the backrest element 2 having a first contact surface 3 and the seat element 5 having a second contact surface 6. The first contact surface 3 and the second contact surface 6 are suitable and provided for coming into contact with an occupant. The first contact surface 3 extends within a first imaginary plane 4. The second contact surface 6 extends within a second imaginary plane 7.

In the present case, flat contact surfaces 3, 6 are ideally assumed. It would naturally be conceivable that the contact surfaces of the back element 2, for example, have a curvature or are designed in a shell-like manner. A lateral region of the backrest element 2 can be configured such that it protrudes towards the front along the longitudinal direction X, resulting in the backrest element 2 assuming an ergonomically comfortable shape. In such a configuration, a rear central region of the backrest element 2 can be assumed as the first contact surface, said region extending substantially in a planar manner or parallel to the width axis Y.

Said imaginary planes 4, 7 intersect in the intersecting axis SR. However, when the backrest element 2 is pivoted about the rotational axis a, the seat element 5 remains within the second imaginary plane 7. However, the first contact surface 6 and thus the first imaginary plane 7 are pivoted by the inclination angle α. When the backrest element 2 is pivoted about the rotational axis α, the seat element 5 is displaced along the longitudinal axis X. Such a displacement can be caused by a mechanical coupling of the backrest element 2 to the seat element 5. Such a mechanical coupling can be a thrust connection, a gear-like connection, or the like. The displacement of the seat element 5 can also be caused by the rotational movement of the occupant 16. The intersecting axis SR is displaced when the backrest element 2 is pivoted along the longitudinal axis X. Thus, the distance A is also changed when the backrest element is pivoted. When the backrest element 2 is pivoted towards the rear, the intersecting axis is displaced towards the front along the longitudinal axis. The distance A is increased accordingly.

Figure 2:
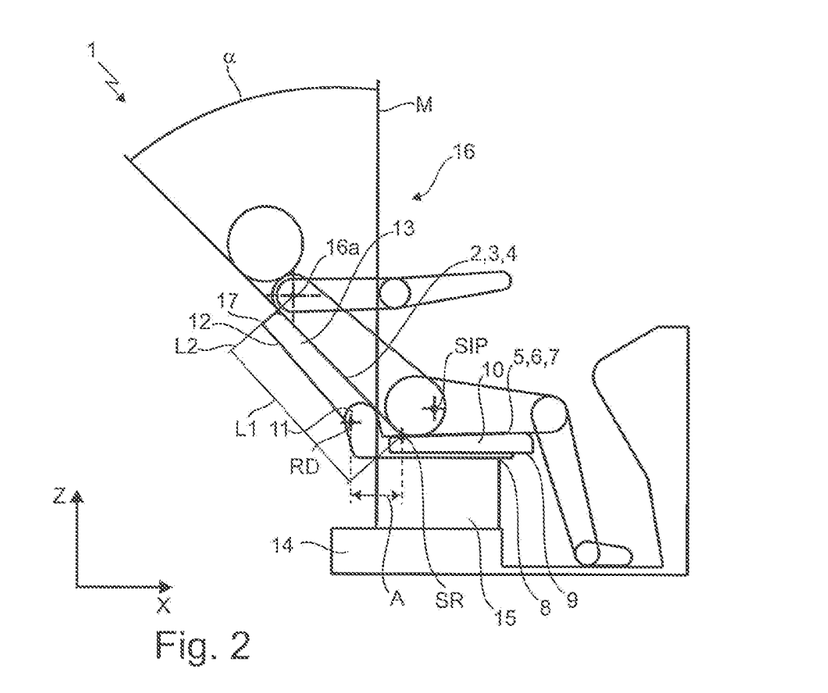
FIG. 2 shows a vehicle seat with a second inclination angle.

FIG. 2 shows a vehicle seat 1 with an occupant 16. An imaginary pivot point SIP can be assigned to the occupant 16. The upper body of the occupant 16 thus rotates substantially about said imaginary pivot point SIP relative to the lower body parts of said occupant.

For comparison purposes, FIGS. 4, 5, and 6e to 6h show vehicle seats 1a with a distance A which is smaller than the minimum distance according to the invention of 60 mm at an inclination angle of α=10°. For identifying the individual components, the same reference signs as for the other vehicle seats 1 have been used. FIGS. 1, 2, and 6a to 6d show vehicle seats which have the minimum distance A=60 mm at an inclination angle of α=10°. In these vehicle seats 1, the rotational axis RD is displaced towards the rear along the longitudinal axis X when compared to the vehicle seats 1a shown in FIGS. 4, 5, and 6e to 6h. In this case, the intersecting axis SR serves as a reference point. The displacement of the rotational axis RD along the longitudinal axis (X) towards the rear results in an upper edge 17 of the backrest element 2 having a large upward displacement in relation to the intersecting axis SR when the backrest element 2 is pivoted towards the rear. Accordingly, the first contact surface 3 is also displaced upwards relative to the occupant 16. Accordingly, a distance between the upper edge of the backrest element and the shoulder joint point 16a of the occupant 16 is reduced. Due to the vehicle seat according to the invention, an upward displacement of the first contact surface is achieved, which is sufficient to ensure appropriate support for the upper back.

The occupant is assumed to be what is known as a "50 perc person." The 50th percentile is a standard term and represents the body measurements "medium." Statistically, 50% of all values are thus above and below this value. A male "50 perc driver" therefore has, for example, a body height of 175.0 cm and a shoulder height of 145.0 cm.

The lengths L1 and L2 are indicated in the drawings. In this case, the length L1 is the direct length between the intersecting axis SR and the upper edge 17 of the backrest element 2. The length L2 is the distance between the upper edge 17 of the backrest element 2 and a height, at which the shoulder joint point 16a of an occupant 16, or a so-called 50 perc person, is located. It can be clearly seen in FIGS. 2 and 5 that, at an inclination angle of $\alpha=45°$, the vehicle seat 1 according to the invention has a significantly greater length L1 and a significantly smaller length L2.

The rotational axis RD is also spaced apart from the intersecting axis (SR) along a height axis (Z). An increase in the distance between the rotational axis RD and the intersecting axis (SR) along the height axis Z can also be an advantage in terms of comfort. A diagonal distance D between the rotational axis RD and the intersecting axis SR can be determined from the horizontal distance A and the height distance H: $D=\sqrt{A^2+H^2}$.

FIGS. 6a to 6d show exemplary vehicle seats 1 with a rotational axis RD displaced towards the rear for different inclination angles $\alpha$. The corresponding values for the lengths L1 and L2 are provided in the drawings. It goes without saying that the present invention should not be regarded as being reduced to these specific values. FIGS. 6e to 6h show vehicle seats 1a, in which the distance A is smaller than the minimum distance A=60 mm according to the invention. The corresponding values for the lengths L1 and L2 are once again indicated. The following table shows the values of the lengths L1 and L2 for vehicle seats 1 with the rotational axis RD displaced towards the rear, and the values of the comparison vehicle seats:

|  | Vehicle seat 1 | | Comparison vehicle seat 1a | |
|---|---|---|---|---|
| $\alpha$ [°] | L1 [mm] | L2 [mm] | L1 [mm] | L2 [mm] |
| 10 | 499 | 139 | 501 | 139 |
| 22 | 522 | 99 | 508 | 115 |
| 34 | 551 | 55 | 518 | 89 |
| 45 | 588 | 4 | 534 | 61 |

With an inclination angle $\alpha=45$, a significantly greater length L1 of 588 mm can thus be seen compared to 534 mm. Accordingly, a significantly longer first contact surface is available for the occupant. Furthermore, the length L2=4 mm is significantly shorter in contrast to L2=61 mm. The occupant 16 thus has significantly better support in the region of the shoulder joint point 16a.

The present invention is naturally not to be reduced to vehicle seats which have such short backrest elements 2. Such a displacement of the first contact surface 3, or such an extension of the first contact surface 3, can also increase the comfort of vehicle seats with higher backrests.

The backrest element 2 is pivotably arranged on a retaining device 11. The retaining device has two legs which are arranged on the side of the vehicle seat 1 or the seat element 5. The legs are fastened to the seat substructure 8. In this case, a physical rotational axis RD can be provided, which is continuous along the width of the vehicle seat and is mounted in/on the two legs. However, the backrest element 2 can also be rotatably mounted on the laterally arranged legs with short rotational axes or bolts. These rotational axes, or bolts, then lie accordingly on the imaginary rotational axis RD.

The retaining device 11 can comprise a locking device which locks an inclination of the backrest element 2. Furthermore, a reset device can be provided which displaces the backrest element 2 back into a predeterminable starting position. Furthermore, an operating device can be provided, by means of which the locking device can be operated and by means of which an inclination of the backrest element 2 can be adjusted.

The backrest element 2 can furthermore comprise a length modification device which is suitable and provided for effecting an expansion of a length of the backrest element 2 when the backrest element 2 is pivoted about the rotational axis RD. In this case, an adjusting element can be provided which can accordingly displace the upper edge 17 of the backrest element 2 upwards. Accordingly, the length L1 could be further increased and the length L2 could be further reduced by the length modification device.

All features disclosed in the application documents are claimed as being essential to the invention, provided that they are, individually or in combination, novel over the prior art.

LIST OF REFERENCE SIGNS

1 Vehicle seat
1a Vehicle seat (comparison)
2 Backrest element
3 First contact surface
4 First imaginary plane
5 Seat element
6 Second contact surface
7 Second imaginary plane
8 Seat substructure
9 Plate-like element
10 Cushion element
11 Retaining device
12 Frame or a shell element
13 Cushion element
14 Vehicle body
15 Suspension and/or damping device
16 Occupant
16a Shoulder joint point of the occupant
17 Upper edge of the backrest element
A Distance
SR Intersecting axis of the first imaginary plane and the second imaginary plane
RD Rotational axis M Central axis
Z Height axis
X Longitudinal axis
Y Width axis
α Inclination angle

What is claimed:

1. A vehicle seat comprising:
a backrest element having a first contact surface which is arranged within a first imaginary plane; and
a seat element having a second contact surface which is arranged within a second imaginary plane which is defined by a longitudinal axis and a width axis of the vehicle seat,
wherein the first imaginary plane and the second imaginary plane intersect in an intersecting axis,
wherein the backrest element is pivotable relative to the seat element about a rotational axis,
wherein an inclination angle of the backrest element extends between the first imaginary plane and a central axis which runs perpendicularly to the second imaginary plane,
wherein in a first position of the backrest element, a distance along the longitudinal axis between the rotational axis and the intersecting axis is at least 60 millimeters (mm), and
wherein, in the first position of the backrest element, the inclination angle is substantially 10 degrees.

2. The vehicle seat according to claim 1,
wherein the distance is at least 65 mm, and
wherein the distance is maximally 200 mm.

3. The vehicle seat according to claim 1,
wherein the backrest element has a frame or a shell element,
wherein the rotational axis extends along a longitudinal direction behind the frame or the shell element, and
wherein the backrest element comprises a cushion element that is arranged on the frame or the shell element.

4. The vehicle seat according to claim 1,
wherein the backrest element and the seat element are mechanically coupled with a mechanical coupling,
wherein the mechanical coupling can cause a translational movement of the seat element along the longitudinal axis when the backrest element is pivoted about the rotational axis, and
wherein an elastic bridge portion is provided at least in sections between the backrest element and the seat element.

5. The vehicle seat according to claim 1,
wherein the backrest element comprises a length modification device that can expand a length of the backrest element when the backrest element is pivoted about the rotational axis.

6. The vehicle seat according to claim 1,
wherein the vehicle seat has a retaining device on which the backrest element is pivotably arranged, and
wherein the retaining device is connected to a seat substructure.

7. The vehicle seat according to claim 6,
wherein the retaining device comprises a locking device that locks an inclination of the backrest element, and
wherein an operating device is provided that can be used to operate the locking device and to adjust the inclination of the backrest element.

8. The vehicle seat according to claim 1,
wherein the vehicle seat comprises a seat substructure, and
wherein the seat substructure comprises at least one of a suspension or a damping device for at least one of vertical or horizontal vibrations.

9. The vehicle seat according to claim 8,
wherein the seat element is displaceably arranged on the seat substructure,
wherein the seat element is displaced along a longitudinal direction when the backrest element is pivoted by the inclination angle,
wherein the seat element comprises an element that is displaceably arranged on the seat substructure, and
wherein a cushion element is arranged on the element.

10. The vehicle seat according to claim 8,
wherein the backrest element comprises a length modification device that expands a length of the backrest element when the backrest element is pivoted about the rotational axis.

11. The vehicle seat according to claim 8,
wherein the rotational axis is spaced apart from the intersecting axis along a height axis.

12. The vehicle seat according to claim 8,
wherein the backrest element has a frame or a shell element,
wherein the rotational axis extends along a longitudinal direction behind the frame or the shell element, and
wherein the backrest element comprises a cushion element that is arranged on the frame or the shell element.

13. The vehicle seat according to claim 8,
wherein the backrest element and the seat element are mechanically coupled with a mechanical coupling,
wherein the mechanical coupling can cause a translational movement of the seat element along the longitudinal axis when the backrest element is pivoted about the rotational axis, and
wherein an elastic bridge portion is provided at least in sections between the backrest element and the seat element.

14. The vehicle seat according to claim 8,
wherein the backrest element is pivotably arranged on a retaining device, and wherein the retaining device is connected to the seat substructure.

15. The vehicle seat according to claim 14,
wherein the retaining device comprises a locking device that locks an inclination of the backrest element, and
wherein the vehicle seat comprises an operating device that can be used to operate the locking device and to adjust the inclination of the backrest element.

16. The vehicle seat according to claim 1,
wherein the rotational axis is spaced apart from the intersecting axis along a height axis.

17. The vehicle seat according to claim 16,
wherein the backrest element has a frame or a shell element,
wherein the rotational axis extends along a longitudinal direction behind the frame or the shell element, and
wherein the backrest element comprises a cushion element that is arranged on the frame or the shell element.

18. The vehicle seat according to claim 16,
wherein the backrest element comprises a length modification device that can expand a length of the backrest element when the backrest element is pivoted about the rotational axis.

19. The vehicle seat according to claim 16,
wherein the vehicle seat comprises a seat substructure, and wherein the seat substructure comprises at least one of a suspension or a damping device for at least one of vertical or horizontal vibrations.

20. The vehicle seat according to claim 19,
wherein the backrest element is pivotably arranged on a retaining device, and wherein the retaining device is connected to the seat substructure.

\* \* \* \* \*